Figure 1:
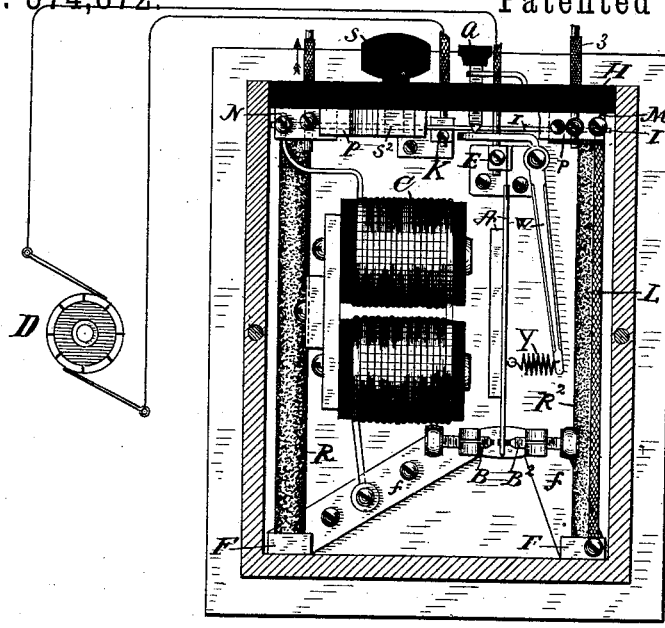

(No Model.) 2 Sheets—Sheet 1.

W. HOCHHAUSEN.
APPARATUS FOR REVERSING AND CONTROLLING ELECTRIC MOTORS AND OTHER TRANSLATING DEVICES.

No. 374,872. Patented Dec. 13, 1887.

WITNESSES:

INVENTOR

BY

ATTORNEY (No Model.) 2 Sheets—Sheet 2.
W. HOCHHAUSEN.
APPARATUS FOR REVERSING AND CONTROLLING ELECTRIC MOTORS
AND OTHER TRANSLATING DEVICES.
No. 374,872. Patented Dec. 13, 1887.
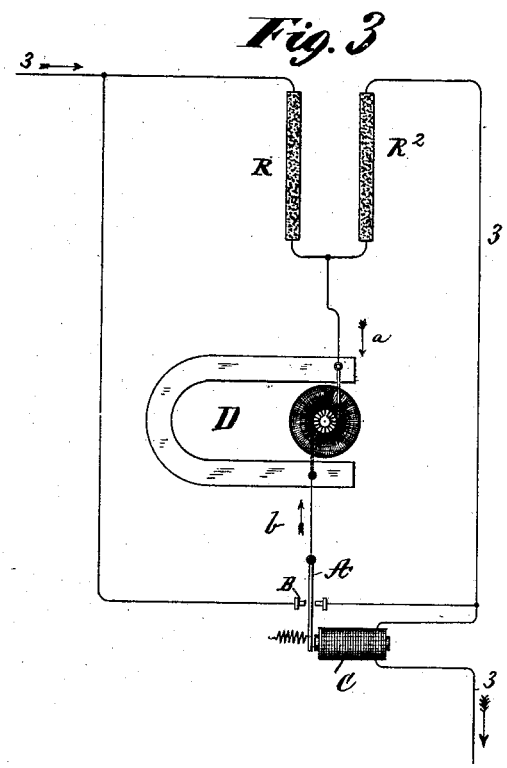
WITNESSES:
INVENTOR
Wm. Hochhausen
BY
ATTORNEY

UNITED STATES PATENT OFFICE.

WILLIAM HOCHHAUSEN, OF BROOKLYN, NEW YORK.

APPARATUS FOR REVERSING AND CONTROLLING ELECTRIC MOTORS AND OTHER TRANSLATING DEVICES.

SPECIFICATION forming part of Letters Patent No. 374,872, dated December 13, 1887.

Application filed February 1, 1886. Serial No. 190,518. (No model.)

*To all whom it may concern:*

Be it known that I, WILLIAM HOCHHAUSEN, a citizen of the United States, and a resident of Brooklyn, in the State of New York, have invented certain new and useful Apparatus for Reversing and Controlling Electric Motors or other Translating Devices, of which the following is a specification.

My invention relates to an arrangement of artificial resistances and switching appliances whereby the direction of an electric current through an electric motor or other translating device may be changed, and whereby, also, the flow of current may be stopped without in any instance breaking or rupturing the electric circuit from which the motor or other translating device derives its operating current.

My invention is designed more especially to furnish a means for controlling the action of an electric motor employed as a motive agent for operating the devices, whereby the action of a dynamo-electric machine may be governed so as to control the flow of current under varying conditions of external circuit, driving-power, &c.

In previous patents issued to me I have shown and described an electric motor employed for shifting the brushes of a commutator on a dynamo-machine and for operating an electric switch for determining the number of field-magnet coils that shall be in action, such adjustments being made ordinarily for the purpose of determining the electro-motive force of the current developed by the dynamo. In the operation of such current-adjusting devices, when they are driven by the electric motor, it becomes necessary to reverse the movement of the motor, and also to leave it in condition where it will not be moved.

My present invention furnishes a ready and convenient means for reversing the movements of electric motors by reversing the direction of currents through them, and also for bringing the same to rest.

The design, among other things, is to provide an arrangement that may be used with advantage upon circuits carrying heavy currents.

The electric switch may be operated by hand or by an electro-magnet, according as it is desired to obtain automatic movements of the motor or not.

The invention consists, mainly, in the arrangement of artificial resistances in series upon the circuit, in combination with switching appliances for completing a branch around one or the other artificial resistance singly at pleasure, and in placing the electric motor or other translating device in a portion of circuit common to both branches, so that the current will pass through the motor in one direction or the other, according to which branch is closed, and said motor will be out of circuit when both branches are open.

The arrangement of circuits will be more clearly understood from the accompanying drawings, in which—

Figure 2:
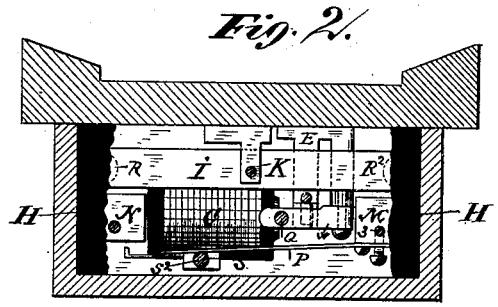

Figure 1 is a side elevation of an apparatus that may be employed for effecting the desired operation. Fig. 2 is a plan of the switch appliances for shunting the apparatus when it is desired to throw the same out of action. Fig. 3 is a diagram illustrating the principle of the invention.

The manner of constructing and combining the apparatus of Fig. 1 will be more clearly understood after the description of the circuits shown in Fig. 3. In said figure the general circuit upon which the motor is to be worked is indicated by the numeral 3, while R R$^2$ indicate two artificial resistances or portions of an artificial resistance of any desired kind placed in series with one another on the circuit 3. These resistances may be conveniently constructed of two carbon pencils, such as are ordinarily employed in electric lighting. In the circuit 3 is indicated an electro-magnet, C, which may or may not be used, as desired, for operating the switch, but which would naturally be used when the motor is connected to devices for governing the current supplied from a dynamo-machine to the circuit.

The electric switch is typified by a lever, A, which may be brought into contact with one or the other of two contact-stops, B B$^2$, or may maintain a position between the stops, so as to close the connection to neither of them. The stops are connected to the circuit 3 at opposite sides of the two artificial resistances, as shown, while the lever A is connected to the point of the circuit 3 between said artificial resistances. In the connection from said lever to such point is placed the electric motor D or other translating device. It will be apparent that when the lever closes on the contact B a branch is completed through the electric motor and around the artificial resistance R, while if said lever makes contact with the other stop, B², the artificial resistance R² has a branch completed around it, the resistance R being then in circuit, so as to carry all the current. In both instances it will be apparent that current will be diverted to the electric motor by reason of the presence of artificial resistance R or R² in the circuit 3, but that in the first instance the current will pass in the direction of the arrow $b$, while in the second instance it will pass in the direction of the arrow $a$, thus producing rotation of the motor in opposite directions, according to the position of the switch. When the switch is out of contact with both stops B B², the current on the circuit 3 passes through resistances R R² in the ordinary way. It will be seen that in no instance is the electric circuit 3 broken or interrupted in any manner.

The resistances R R² may be very low when the current on the circuit 3 is strong, since under such circumstances but little current need be diverted in order to operate the motor.

If the switch be operated by the electromagnet C, it is obvious that the retractor for the lever A may be so adjusted that with the normal current flowing on the circuit the lever will be maintained in a central position between the stops and the motor will be at rest. If the current diminish in strength, the retractor will close the branch around resistance R, bringing the motor into circuit to take current in one direction, while if the current increase above normal the branch will be completed around the resistance R², bringing the motor into circuit in a way to take current in the opposite direction. If said motor be connected to the current-adjusting devices, the current on the circuit may be kept uniform.

The details of construction of the appliances which I prefer to employ are shown in Fig. 1, mounted on a suitable base-plate. The carbon resistances R R² are at one end stepped in supports F, of metal, formed upon plates $f$, secured to the base-plate, and carrying, respectively, two contact-stops, B B², for the switch A. The latter is secured to a metallic block, E, carrying the binding-screw for the connecting of an electric wire leading to a motor through a plate of insulating material, H. The upper ends of the carbon blocks are held in perforations at the ends of the conducting-spring I, which at its center is clamped in a block, K, of conducting material, that carries a set-screw for attachment of the wire leading to the electric motor, so as to complete the connection from the switch and block E to said motor, to spring I, and to the artificial resistances. Connection of the general circuit 3 to the resistance R² is made by a conductor, L, clamped at one end to the stop F and at the other to a block, M, to which the incoming conductor is secured. The outgoing conductor connects with the lower end of the carbon stick or pencil R through a block, N, of conducting material, carrying binding-screws for the attachment of said conductor and for the attachment of the wire leading to the electro-magnet C, and through the same to the plate $f$, carrying the stop or support for carbon R.

To provide for shunting the apparatus just described when desired, I employ a shunting-switch consisting of a spring, P, secured at one end to block M, and having its opposite end arranged over block N, into contact with which latter it may be forced at pleasure by means of a thumb-piece and stem, S, that is mounted on the block H and carries the cam-piece S², adapted to engage with the spring. The circuits will be found on examination to be substantially the same as are indicated in Fig. 3. The current, entering at block M, passes to the stop F, and thence, when the switch A is out of contact with both stops B B², through rod R², spring I, rod R, plate $f$, electro-magnet C, and block N. On completion of connection at a point, B², a portion of the circuit branches from right-hand plate $f$, through A, block E, electromotor D, block K, and the spring I, (where it unites with the portion passing through resistance R²,) to resistance R. When contact is closed at B, current passes in the opposite direction through the motor, the point of derivation being in such case at the block K, where the current divides after having passed through block R², part passing by way of rod R to the plate F and electro-magnet C, while the other part passes through the block E, switch A, and stop B to the same point.

I do not limit myself, of course, to the particular construction of the appliances herein illustrated, but only show the same as a convenient and satisfactory arrangement.

To provide for adjustment of the retractor of switch A when the same is employed in connection with current adjusting or governing mechanism, there is employed a lever, W, connected with the retractor-spring I for said lever, and having an angular extension or arm, upon which bears a set-screw, Q, mounted on the block H.

The spring I, formed at its ends to constitute a socket or holder for the upper ends of the carbon pencils R R², furnishes a device whereby said rods may be conveniently replaced at pleasure.

What I claim as my invention is—

1. The combination, with an electric motor and two artificial resistances connected in series, of means for completing a branch circuit around either resistance at pleasure, and a portion of branch circuit common to both containing an electric motor or other translating device.

2. The combination, with an electric motor, of two artificial resistances placed in series, a two-point switch, one of whose points is connected to the circuit on one side of the artificial resistances, while its other point is connected to the circuit on the other side of the artificial resistances, and a connection from the switch to the circuit containing the resistances at a point between said resistances, said connection containing the electric motor or other translating device.

3. The combination, with the artificial resistances in series with one another and the electric motor placed in a portion of branch-circuit connection common to both resistances, of an electric switch for completing a branch around one or the other of the resistances at pleasure, and a controlling electro-magnet connected to the circuit of said resistances.

4. The combination, with the two carbon-pencil resistances $R\ R^2$, of spring sockets or holders for one end of each pencil, formed at the ends of the plate-spring I, secured to a block that is in electric connection with one pole of the electric motor or other translating device.

5. The combination, with the carbon resistance-pencils, of plates of metal, $f$, having steps or seats for said pencils, and carrying also the contacts or stops of an electric switch that is connected through an electric motor or other translating device with the opposite ends of said pencils, and electric connections from the plates $f\,f$ to the electric circuit.

WILLIAM HOCHHAUSEN.

Witnesses:
WM. H. CAPEL,
GEO. C. COFFIN.